UNITED STATES PATENT OFFICE.

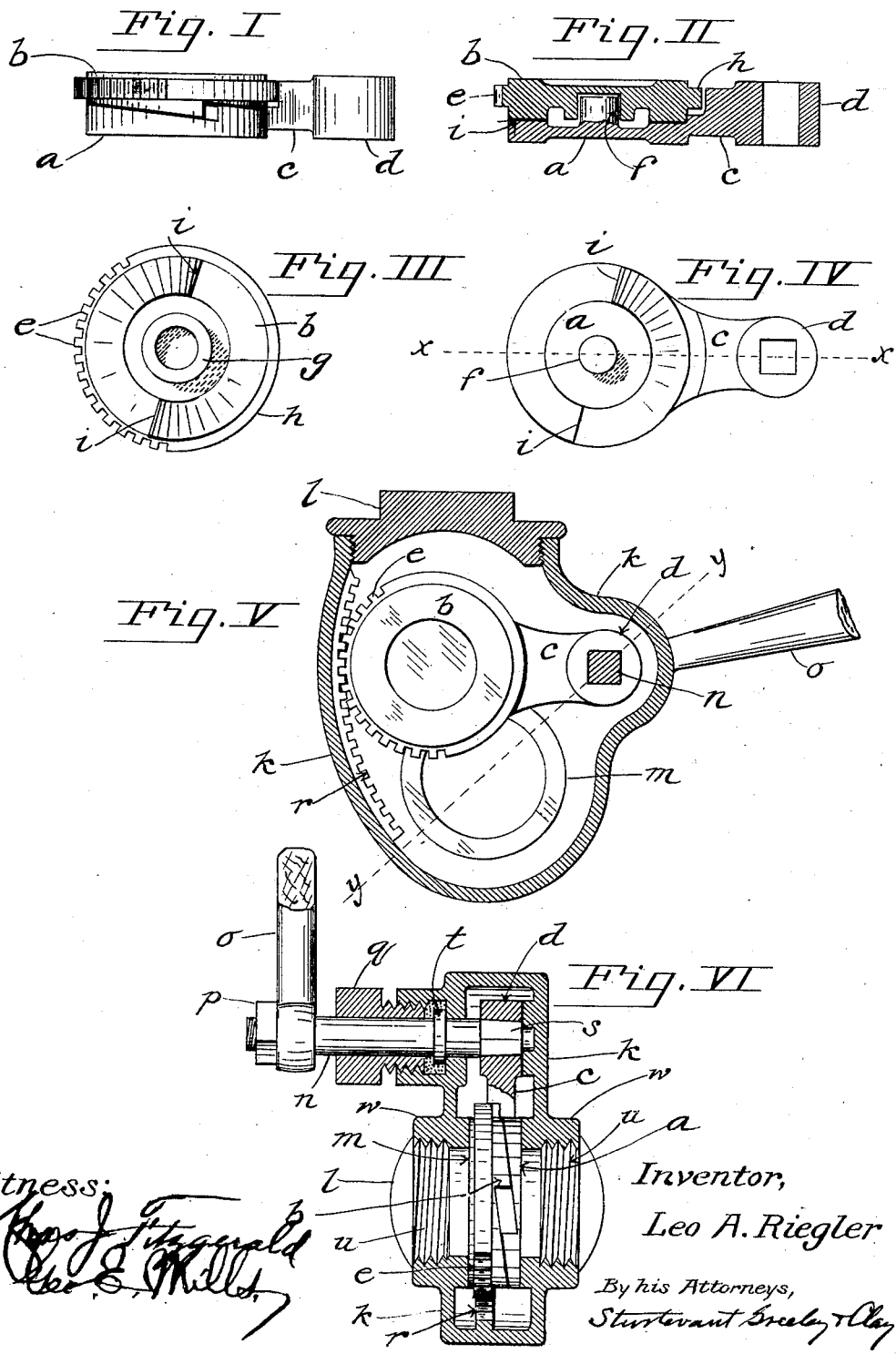

LEO A. RIEGLER, OF CINCINNATI, OHIO.

EXPANDING GATE-VALVE.

SPECIFICATION forming part of Letters Patent No. 711,262, dated October 14, 1902.

Application filed May 3, 1902. Serial No. 105,838. (No model.)

*To all whom it may concern:*

Be it known that I, LEO A. RIEGLER, a citizen of the United States, residing at Cincinnati, in the State of Ohio, have invented a certain new and useful Expanding Gate-Valve, of which the following is a specification.

My invention relates to valves for regulating the flow of liquids, and particularly to the class of valves that slide or swing in the direction of the seating-faces after the manner of a sliding gate; and it consists, essentially, of a valve having two parts pivoted together in contact by inclined faces coöperating with a rack for turning the inclined faces on each other as the parts move to their seats, expanding the parts to make close contact on the seats.

In the accompanying drawings, Figure I is a side elevation of the two-part valve. Fig. II is a medial section of the same on the line $x$ $x$ in Fig. IV. Fig. III is an inside plan view of the upper or rolling part. Fig. IV is a similar view of the under part or carrier. Fig. V is a vertical section through the valve-casing parallel with the valve-seats. Fig. VI is a section of the casing along the line $y$ $y$ in Fig. V, showing the spindle for operating the valve and the valve closed on its seats.

The advantages of the quick-acting sliding gate-valves have heretofore been counterbalanced by the disadvantage of weak and faulty closure on the seat or seats, and where two-part expanding valves have been used to overcome this trouble, in which the expanding is done by a wedge, difficulty has been met with in the great friction of sliding on the seat after the pressure is applied and the difficulty of opening again. To avoid all these difficulties, I use a valve composed of the two parts $a$ $b$, pivoted to turn with respect to each other and fitting together on inclined faces $i$. For pivoting I ordinarily use a short spindle $f$ on the carrier part $a$ and provide a socket-rim $g$ on the rolling part $b$; but evidently I might make this rim $g$ larger and let it bear directly on the outside of the inclined faces $i$, when the spindle $f$ may be dispensed with.

The part $a$, which is the carrier, has an extension-arm $c$, carrying a head $d$ to receive a spindle $n$, Fig. VI, about which the whole valve swings as a pivot to open and close the passage-way in the casing. Outside the inclined faces $i$ is an extended rim $h$, having a part of its circumference provided with gear-teeth $e$, which as the valve swings on the spindle $n$ engage the rack $r$, fixed on the inner surface of the casing, Fig. V. This gearing turns the revolving part $b$ on the carrier part $a$, so that the parts slide on the inclines, and thus expand or spread apart the halves of the valve to make close contact on the seats $m$ in the casing.

Supposing the valve closed, by means of the lever-handle $o$ spindle $n$ is turned, the pressure on the seats is instantly released before any appreciable sliding on the seats occurs, and as the part $b$ rolls upward on the rack all pressure is relieved, thus making a very easy acting gate. The spindle $n$ is squared at $s$ in the head $d$ of the carrier. It extends through the casing and a packing-box behind the annular shoulder $t$, held in place by means of the nut $q$. The casing has threads $u$ for the pipe and an opening at the top closed, as by a screw-plug $l$, for gaining access to the parts. By this design very little space or metal is required, and the valve-seats may be subjected to all the pressure attainable by a screw. Any wear of the faces of the valve are taken up necessarily by the very act of closing the valve. The valve opens with about a quarter-turn of the handle $o$. While both the valve members slide into place and the part $b$ revolves also, and thus insure a clean seat, it will be observed that by reason of the rolling of the part $b$ on the rack in opening the pressure of the faces will be relieved slightly in advance of any perceptible sliding, because the motion of the (imaginary) lever-arm at the rack $r$ will be greater, because at a greater distance from the pivot, than the motion on the seats themselves. The slightest rolling on the rack releases the pressure.

The inclined faces $i$ may of course be of any desired number, and it is evident that the valve might be thrust in a direct line to its seat instead of swinging on the arm as a pivot, the essential characteristic of the device being that as the valve moves to place one part is turned on the other by rolling on a rack in order to expand the parts.

Having thus described my invention, what I claim as new, and desire to protect by Letters Patent, is the following:

1. The two-part valve consisting of a pivoted arm rigidly carrying a valve-disk, and a second valve-disk pivoted on the first disk and in contact therewith on inclined faces, combined with means for turning the said disks on each other as the arm swings them into their seating positions.

2. The two-part valve composed of two disks pivoted together to revolve on one another in contact on inclined faces, one of said disks being rigidly carried on a swinging arm which carries the two disks, the other disk having gear-teeth to coöperate with a rack for the purpose of turning the disk.

3. The combination of a casing having two parallel valve-seats and a curved rack, with a valve composed of one disk rigidly carried on a pivoted arm and another disk pivoted to the first, resting thereon on inclined faces and having gear-teeth to engage said rack and revolve as the two disks swing on said arm into position between the two seats.

4. The combination with a valve, of a valve-casing having two valve-seats, a lateral chamber adapted to contain an arm pivoted at one side thereof, and on the opposite side thereof a circular rack having its center at the pivoting-point of the said arm.

5. The valve-casing having two parallel valve-seats, a lateral chamber and a circular rack, combined with a swinging arm in said chamber having a disk-shaped head, and another disk pivoted on the head and provided with gear-teeth to engage the said rack as the arm carries the two disks into seating position between the seats.

6. In combination with a gate-valve, a valve-casing having a lateral chamber to contain a swinging arm, and a circular rack ranged about the pivoting position of the arm, for the purpose set forth.

7. The combination in a two-part valve of a casing having valve-seats and a circular rack, a swinging arm mounted in said casing and carrying a disk-head, a second disk pivotally mounted on the head and in contact therewith on inclined faces, the latter disk being provided with gear-teeth to engage the rack, and means to swing the arm from the outside, whereby the disks move over the valve-seats and by revolving of the loose disk are forced to expand against the seats, as described.

In witness whereof I have hereunto signed my name in the presence of the two subscribing witnesses.

LEO A. RIEGLER.

Witnesses:
F. W. H. CLAY,
GEO. E. MILLS.